(12) United States Patent
Eames et al.

(10) Patent No.: US 6,317,884 B1
(45) Date of Patent: Nov. 13, 2001

(54) VIDEO, DATA AND TELEPHONY GATEWAY

(75) Inventors: Thomas R. Eames, Santa Rosa, CA (US); Charles A. Eldering, Doylestown, PA (US)

(73) Assignee: Next Level Communications, Rohnert Park, CA (US)

(*) Notice: Subject to any disclaimer, the term of this patent is extended or adjusted under 35 U.S.C. 154(b) by 0 days.

(21) Appl. No.: 09/026,036

(22) Filed: Feb. 19, 1998

Related U.S. Application Data

(60) Provisional application No. 60/038,276, filed on Feb. 19, 1997.

(51) Int. Cl.[7] .................................................. H04N 7/18
(52) U.S. Cl. .......................... 725/78; 725/80; 725/106; 725/109; 725/81
(58) Field of Search ............................ 709/217–219; 348/6, 7, 10, 8, 12, 13; 455/3.1, 4.1, 4.2, 5.1, 6.1, 6.2, 6.3; 725/78–82, 85, 74

(56) References Cited

U.S. PATENT DOCUMENTS

| | | | |
|---|---|---|---|
| 5,521,631 | * 5/1996 | Budow et al. | 348/7 |
| 5,574,964 | 11/1996 | Hamlin | 455/3.1 |
| 5,613,190 | 3/1997 | Hylton | 455/3.1 |
| 5,613,191 | 3/1997 | Hylton et al. | 455/3.1 |
| 5,628,055 | 5/1997 | Stein | 455/89 |
| 5,630,204 | 5/1997 | Hylton et al. | 455/3.3 |
| 5,708,961 | 1/1998 | Hylton et al. | 348/6 |
| 5,793,413 | 8/1998 | Hylton et al. | 348/12 |
| 5,828,403 | 10/1998 | DeRodeff et al. | 348/7 |
| 5,842,111 | 11/1998 | Byers | 348/10 |
| 5,936,660 | 8/1999 | Gurantz | 348/734 |

FOREIGN PATENT DOCUMENTS

WO 97/31483   8/1997  (WO) ........................... H04N/7/173

OTHER PUBLICATIONS

Residential Gateway Group publication, "The residential gateway", Oct., 1995, 8 pp.
Generic Requirement, Bellcore, "Active Network Interface Device (Residential Gateway)," GR–2890–CORE, issue 2, Nov. 1996, 19 pp.
Specifications, GTE, "The residential gateway functional specifications," printed from the World Wide Web site http://info.gte.com/gtel/sponsored/rg/webspec.htm on Jul. 24, 1996, 6 pp.

* cited by examiner

Primary Examiner—John W. Miller
(74) Attorney, Agent, or Firm—Covington & Burling

(57) ABSTRACT

A residential gateway for distributing video, data and telephony services is disclosed. The gateway has a MPEG bus connected from a network interface module to a first and a second video processors. A microprocessor controls the first and second video processors by sending control signals across a control bus.

16 Claims, 7 Drawing Sheets

VIDEO, DATA AND TELEPHONY GATEWAY

CROSS-REFERENCE TO PRIOR APPLICATIONS

This application claims the benefit of U.S. Provisional Application No. 60/038,276 filed Feb. 19, 1997.

FIELD OF THE INVENTION

The present invention relates to an apparatus for the distribution of video, data and telephony and other telecommunications services within a residence.

BACKGROUND OF THE INVENTION

Advances in the field of telecommunications allow large amounts of digital information to be delivered to residences. Inside the residence, devices will be connected to the network by twisted wire pairs which provide telephone services today, or by coaxial cable similar to that used by cable operators to provide cable TV services.

Because the majority of new video services will be digital, and because existing televisions are analog, there is a requirement for a device which converts the digital signals supplied by the network to analog signals compatible with existing televisions. Presently available television set-tops can perform this function, but are expensive. Many homes have more than one television, and will therefore require multiple television set-tops to receive digital programming at each location within the home.

A centrally located device can provide connectivity to the digital network as well as providing digital to analog conversion, but methods of distributing the signals around the home are required. In addition, methods of communicating with the centralized device from the different locations in the home are required.

It is also desirable to have data and telephony services in the home, and it is likely that these services will be required in more than one location in the home. In addition, there may be the need for communicating between devices in the home.

For the foregoing reasons, there is a need for a centralized unit in the home which can provide video, data, and telephony services, and methods for communicating with the centralized unit from different locations within the home.

SUMMARY OF THE INVENTION

In a preferred embodiment a centrally located gateway provides analog video services by receiving a digital data stream from a fiber-to-the-curb access system, and directing packets containing video signals to one or more digital video decompression processors. The video decompression processors generate analog video signals which are transmitted to televisions as S-video signals, or modulated onto carriers to produce broadcast type signals compatible with standard televisions.

In a preferred embodiment, the analog video signals which were generated from the digital network are combined with off-air or cable-TV broadcast signals for transmission to the televisions in the residence using a splitter and in-home coaxial cable wiring. The digitally originated signals are modulated onto unused television channels. A low pass filter can be used to insure that the off-air or CATV signal has unused channels in the UHF spectrum.

Return signaling from the televisions in the gateway is provided for by use of wireless remote controls which signal back to the gateway for channel changes and other video signal controls.

In a preferred embodiment an optional module can be inserted into the gateway to provide a standard signal for devices in the residence which are designed to be connected directly to the FTTC access system with coaxial drop cables.

A CATV module can be inserted and provides for the mapping of television channels from a CATV network or antenna for off-air broadcasts to a channel for transmission over the in-home coaxial network. By using the CATV module it is possible to map signals to new channels as well as equalizing signal levels to that there are no large signal differences between the signal levels from the CATV network or antenna and the gateway.

An optional module can be inserted to provide telephony services from the gateway.

Data services can be provided from the gateway, and an Ethernet port is used to connect data devices such as computers to the gateway.

In an alternate embodiment a centralized gateway is connected to televisions in the residence by point-to-point coaxial wiring. A main video decompression processor receives video packets and constructs multiple analog video channels. The multiple analog video channels are made available to inserted modules in the gateway through the use of analog video buses. Inserted video modules are used to modulate the video signals onto a channel which can be received by a television connected to the video module by point-to-point coaxial cable wiring.

In an alternate embodiment signaling from the remote locations in the home to the gateway is accomplished by use of an infrared transmitter and receiver. The receiver receives the infrared signals from the hand-held remote control and signals back the gateway via the in-home coaxial cable wiring. The infrared receiver can also be integrated into the television.

In an alternate embodiment the CATV module provides for the mapping of television channels from a CATV network or antenna for off-air broadcasts to a channel for transmission to an individual television. The CATV module places the analog television signal onto an analog video bus. Any one of the inserted TV modules can receive the signal from the bus and transmit that signal to a particular television.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

Figure 1:
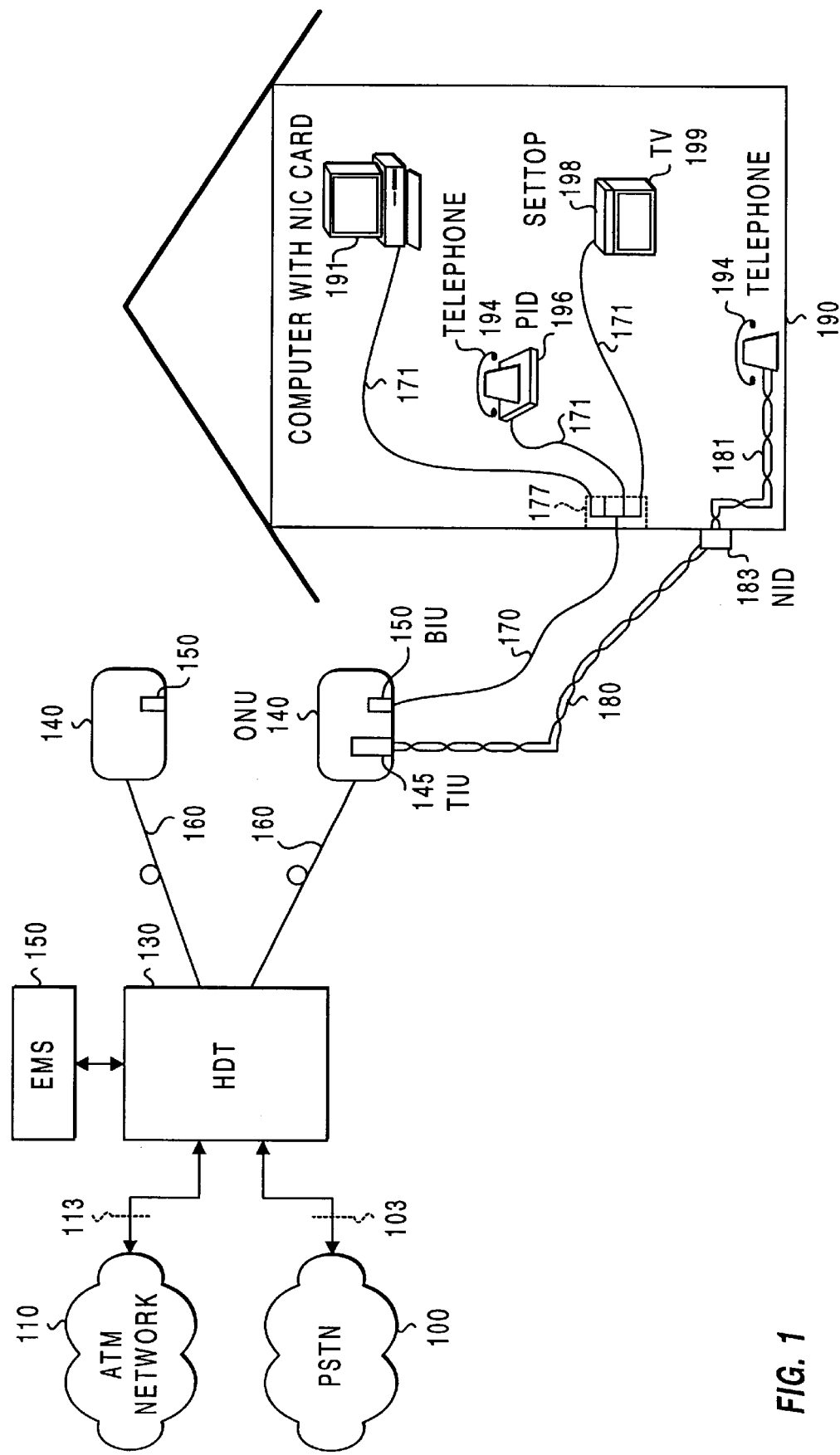
FIG. 1 illustrates a fiber-to-the-curb access system with coaxial drop cables.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 7 in particular, the apparatus of the present invention is disclosed.

Contents
I. Fiber-to-the-curb networks
II. Gateway with point-to-multipoint in-home coaxial wiring
III. Gateway with point-to-point in-home coaxial wiring
I. Fiber-to-the-curb Networks FIG. 1 illustrates a Fiber-to-the-Curb (FTTC) network in which various devices in the residence 190 are connected to the Public Switched Telecommunications Network (PSTN) 100 or Asynchronous Transfer Mode (ATM) network 110. The devices in the residence 190 can include telephone 194, television (TV) 199 with a television set-top 198, computer with Network Interface Card (NIC) 191, and Premises Interface Device (PID) 196 connected to a telephone 194.

The FTTC network illustrated in FIG. 1 works by connecting a Host Digital Terminal 130 to the PSTN 100 and ATM network 110. The PSTN-HDT interface 103 is specified by standards bodies, and in the US are specified by Bellcore specification TR-TSY-000008, TR-NWT-000057 or TR-NWT-000303. The HDT 130 can also receive special services signals from private or non-switched public networks. The physical interface to the PSTN is twisted wire pairs carrying DS-1 signals, or optical fibers carrying OC-3 optical signals.

The interface to the ATM network-HDT interface 113 can be realized using an OC-3 or OC-12c optical interfaces carrying ATM cells. In a preferred embodiment, HDT 130 has two OC-12c broadcast ports, which can only receive signals carrying ATM cells, and one OC-12c interactive port which can receive and transmit signals.

An element management system (EMS) 150 is connected to HDT 130 and is used to provision services and equipment on the FTTC network, in the central office where the HDT 130 is located, in the field, or in the residences. The EMS 150 is software based and can be run on a personal computer in which case it will support one HDT 130 and the associated access network equipment connected to it, or can be run on a workstation in which case multiple HDTs and access networks are supported.

Optical Network Units (ONUs) 140 are located in the serving area and are connected to HDT 130 via optical fiber 160. Digital signals in a Synchronous Digital Hierarchy (SDH)-like format at a rate of 155 Mb/s are transmitted to and from each ONU 140 over optical fiber 160. In a preferred embodiment optical fiber 160 is a single-mode fiber and a dual wavelength transmission scheme is used to communicate between ONU 140 and HDT 130.

A Telephony Interface Unit (TIU) 145 in ONU 140 generates an analog Plain Old Telephony (POTs) signal which is transported to the residence 190 via a twisted wire pair drop cable 180. At the residence 190 a Network Interface Device (NID) 183 provides for high-voltage protection and serves as the interface and demarcation point between the twisted wire pair drop cable 180 and the in-home twisted pair wiring 181. In a preferred embodiment TIU 145 generates POTs signals for six residences 190, each having a twisted wire pair drop cable 180 connected to ONU 140.

As shown in FIG. 1, a Broadband Interface Unit (BIU) 150 is located in ONU 140 and generates broadband signals which contain video, data and voice information. BIU 150 modulates data onto an RF carrier and transmits the data over a coaxial drop cable 170 to a splitter 177, and over in-home coaxial wiring 171 to the devices in the residence 190.

In a preferred embodiment 64 ONUs 140 are served by an HDT 130. Each ONU serves 8 residences 190. In an alternate embodiment, each ONU 140 serves 16 residences 190.

As shown in FIG. 1, each device connected to the in-home coaxial wiring 171 will require an interface sub-system which provides for the conversion of the signal from the format on the in-home coaxial wiring 171 to the service interface required by the device. The PID 194 extracts time division multiplexed information carried on the in-home coaxial wiring 171 and generates a telephone signal compatible with telephone 194. Similarly, the television set-top 198 converts digital video signals to analog signals compatible with TV 199. The NIC card generates a computer compatible signal.

Figure 2:
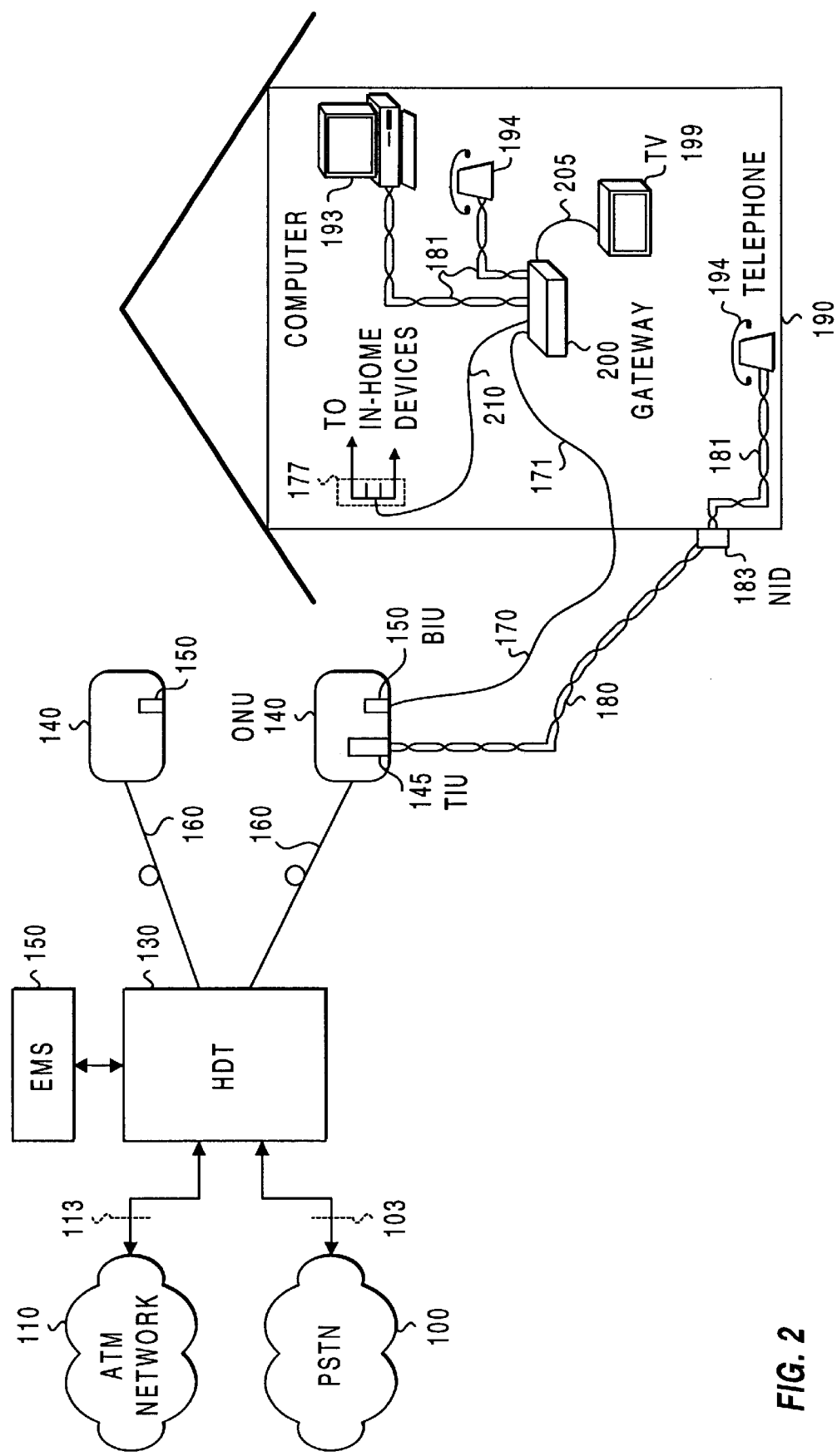
FIG. 2 illustrates a fiber-to-the-curb access system with a gateway used in the residence for the distribution of video, data and telephony signals.

FIG. 2 illustrates the use of a gateway 200 to generate signals compatible with the devices in the home, which are connected to the gateway 200 via in-home twisted pair wiring 181 or in-home coaxial cable wiring 210 and a splitter 177. The connection to the splitter 177 is made using a gateway-splitter connection, which in a preferred embodiment is coaxial cable. A direct connection to a television can be made using a gateway-television connection 205, which in a preferred embodiment is a four conductor cable carrying an S-video signal.

Figure 3:
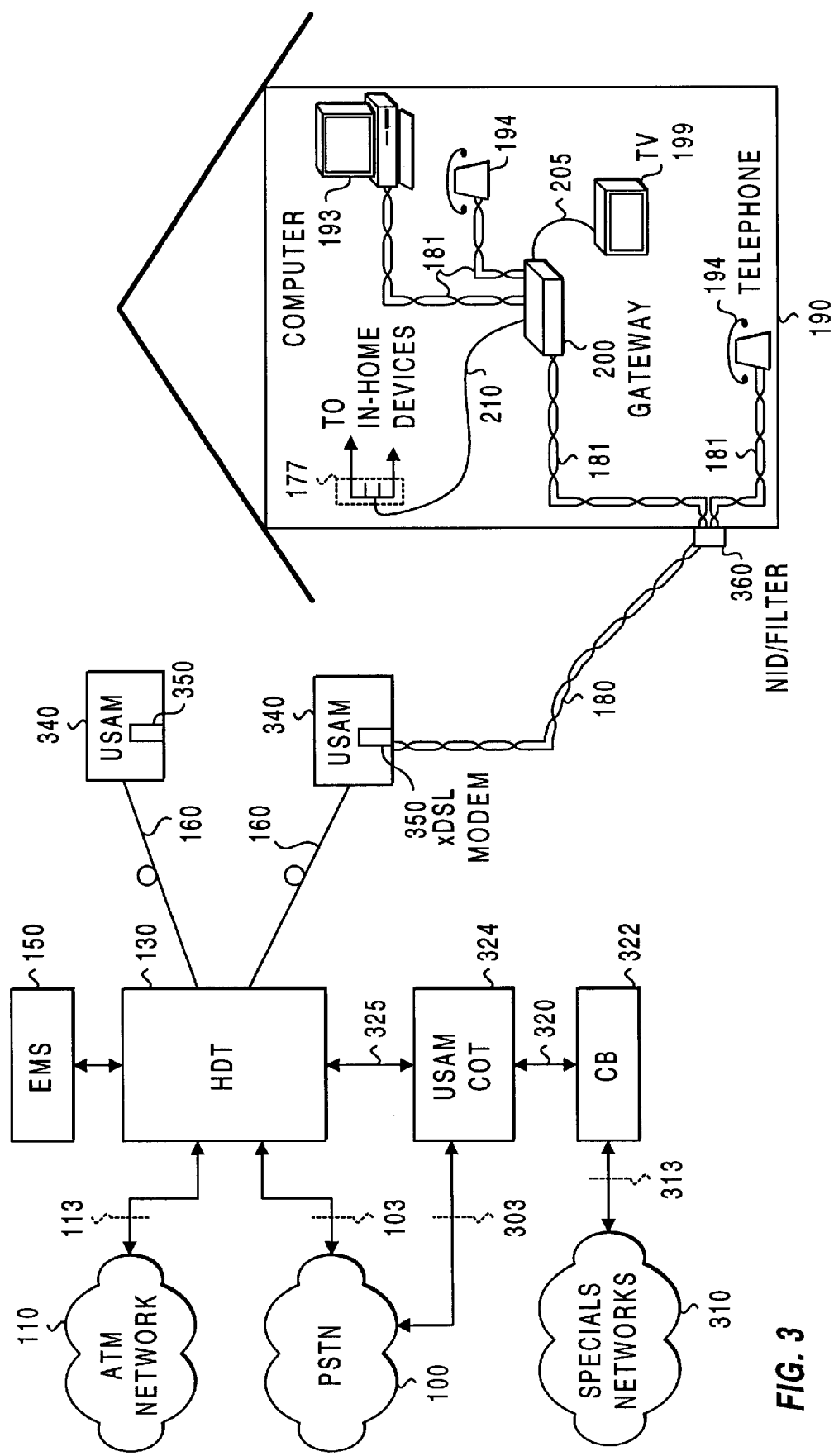
FIG. 3 illustrates a fiber-to-the-curb access system with twisted wire pair drop cable to a residence having a gateway.

FIG. 3 illustrates a FTTC network which relies on twisted wire pair drop cables 180 instead of coaxial drop cables 170. This embodiment is preferable when it is cost prohibitive to install coaxial drop cables from ONUs 140 to residences 190.

As shown in FIG. 3, a Universal Service Access Multiplexor (USAM) 340 is located in the serving area, and is connected to HDT 130 via optical fiber 160. An xDSL modem 350 provides for the transmission of high-speed digital data over the twisted wire pair drop cable 180 to and from residence 190. Traditional analog telephone signals are combined with the digital signals for transmission to the residence 190 and a NID/filter 360 is used to separate the analog telephone signal from the digital signals. The analog telephone signal is sent to telephone 194 over the in-home twisted pair wiring 181.

The digital signals pass through the NID/filter 360 to the gateway 200. The gateway 200 serves as the interface to the devices in the residence 190 including the television 199, the computer 193, and additional telephone 194.

The central office configuration illustrated in FIG. 3 includes a Universal Service Access Multiplexor Central Office Terminal (USAM COT) 324 connected to HDT 130 via a USAM COT-HDT connection 325, which in a preferred embodiment is an STS3c signal transmitted over a twisted wire pair. The PSTN-USAM COT interface 303 is one of the Bellcore specified interfaces including TR-TSY-000008, TR-NWT-000057 or TR-NWT-000303.

A Channel Bank (CB) 322 is also used in the central office to connect specials networks 310, comprised of signals from special private or public networks, to the access system via the specials networks-CB interface 313. In a preferred embodiment, the CB-USAM COT connection 320 are DS1 signals over twisted wire pairs.

When used herein the term subscriber network refers in general to the connection between the ONU 140 and the devices or gateway 200 in the residence 190 or the connection between USAM 340 and the devices or the gateway in the residence 190. The subscriber network may be comprised of coaxial cable and a splitter, twisted wire pairs, or any combination thereof.

Although FIG. 2 and FIG. 3 illustrate the gateway 200 located inside the living area of residence 190, the gateway can be located in the basement, in the garage, in a wiring closet, on an outside wall of the residence 190, in the attic, or in any of the living spaces. For outside locations gateway 200 will require a hardened enclosure and components which work over a larger temperature range than those used for a gateway located inside the residence 190. Techniques for developing hardened enclosures and selecting temperature tolerant components are known to those skilled in the art.

II. Gateway with Point-to-multipoint in-home Coaxial Wiring

Figure 4:
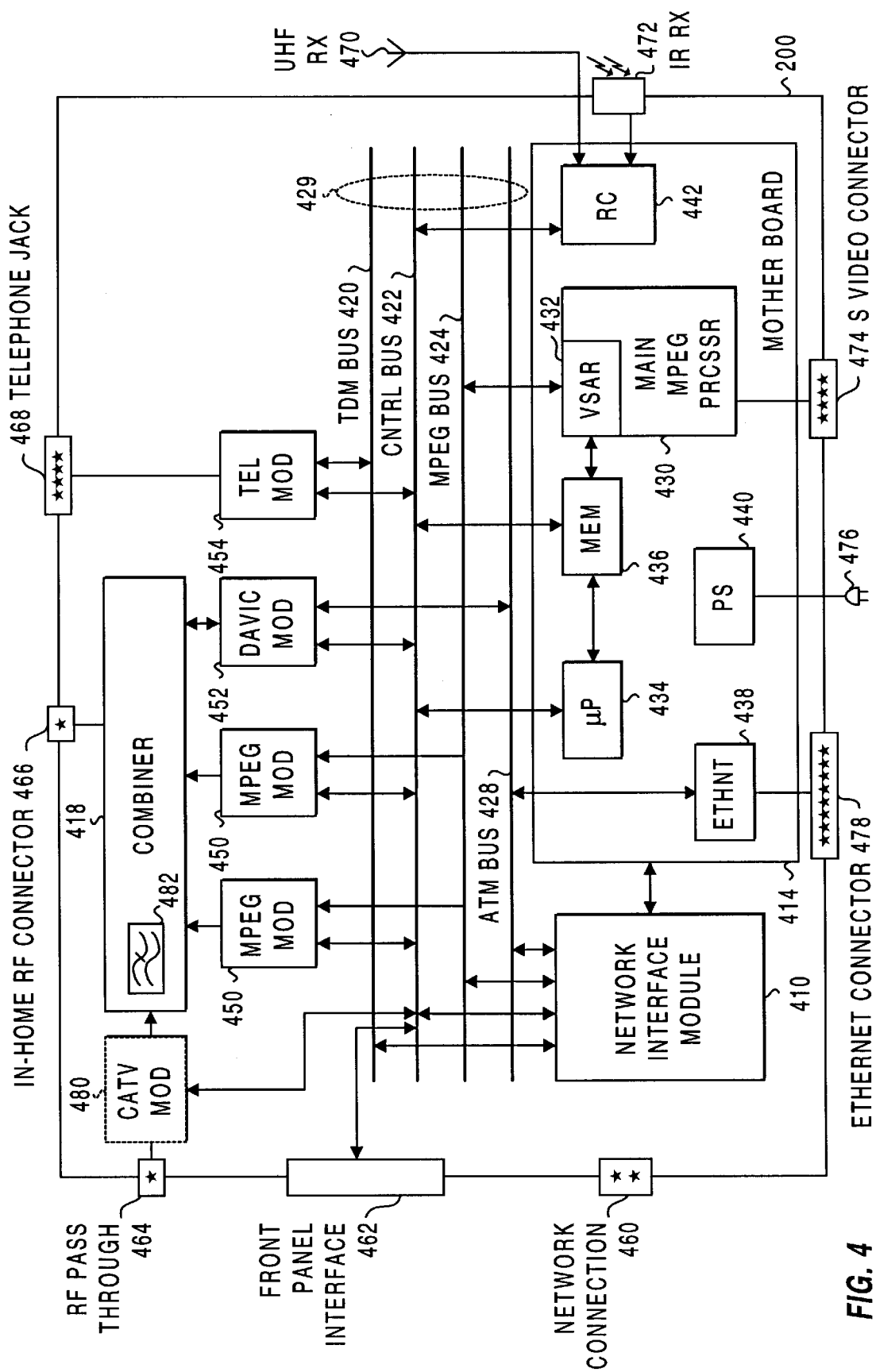
FIG. 4 illustrates an architecture for a video, data and telephony gateway which uses point-to-multipoint in-home coaxial wiring.

FIG. 4 illustrates a gateway 200 which can be used with point-to-multipoint in-home wiring such as that created by the gateway-splitter connection 210, the splitter 177, and in-home coaxial wiring 171, as illustrated in FIGS. 2 and 3.

Gateway 200 of FIG. 4 is comprised of a Network Interface Module (NIM) 410 which connects to the access network through network connection 460. The access network may have a coaxial drop cable 170 for digital services as illustrated in FIG. 2, or may have a twisted wire pair drop cable 180, as illustrated in FIG. 3. NIM 410 will contain the appropriate modem technology for the access network. In a preferred embodiment, different types of NIMs are utilized for access networks having coaxial drop cables than for access networks having only twisted wire pair drops.

NIM 410 interfaces to a mother board 414 which provides the basic functionality of gateway 200. Mother board 414 contains a microprocessor 434, memory 436, power supply 440 connected to an AC outlet via AC plug 476, a main MPEG processor 430, an Ethernet block 438 which connects to an Ethernet connector 478, and a Remote control block 442.

Within the main MPEG processor 430 there is a Video Segmentation and Reassembly (VSAR) section 432 which constructs MPEG packets from an ATM stream received from NIM 410. VSAR section 432 can reduce jitter in MPEG packets which arises from transmission of those packets over the ATM network, as well as constructing a useable MPEG stream in spite of lost ATM cells which contain partial MPEG packets.

The main MPEG processor 430 has an interface to an S video connector 474 which provides connectivity for televisions having an S video port.

Remote control block 442 has an interface to an IR receiver 472 which can receive commands from a hand-held remote control which is operated within the vicinity of gateway 200. Remote control block 442 also has an interface to a UHF receive antenna 470 which can receive commands from hand-held wireless remotes used anywhere in residence 190.

A set of buses 429 is used to route information within gateway 200 and as illustrated in FIG. 4 includes a Time Division Multiplexing (TDM) bus 420, a control bus 422, a MPEG bus 424, and an ATM bus 428.

A number of optional modules can be inserted into gateway 200 including MPEG modules 450, a DAVIC module 452, and a telephony module 454. All of the optional modules are connected to the control bus 422 in addition to being connected to at least one other bus which provides those modules with the appropriate types of data for the services supported by the module.

The MPEG modules 450 provide for decompression of MPEG packets which are constructed by the VSAR section 432. The output of the MPEG module 450 is a signal which is compatible with present televisions, which in the US is the NTSC format. MPEG module 450 can modulate the decompressed analog format video signal onto an available channel for transmission to the televisions 199 in residence 190.

The DAVIC module 452 transmits and receives ATM cells to devices in residence 190 over the in-home coaxial wiring 171, in a format which is identical to that used by the access system with coaxial drop cables illustrated in FIG. 1. The advantage of using DAVIC module 452 is that gateway 200 is compatible with in-home devices which connect directly to the access system as shown in FIG. 1.

The MPEG modules 450 and the DAVIC module 452 are connected to combiner 418 which combines the RF signals from those modules, and can add other RF signals such as off-air broadcast television signals or Community Antenna Television (CATV) signals supplied by a cable television company. Signals from the antenna or cable system are coupled to the RE pass-through 464, which in a preferred embodiment is an F-connector. A low pass filter 482 is used in combiner 418 to insure that the frequencies used by MPEG modules 450 are available. The output of combiner 418 is connected to in-home RF connector 466, which in a preferred embodiment is an F-connector. The connection between the in-home RF connector 466 and splitter 177 is provided by the gateway-splitter connection 210, which in a preferred embodiment is a coaxial cable.

An optional CATV module 480 can be inserted into gateway 200 and allow for mapping of off-air or cable video channels from their original frequencies to new frequencies for in-home distribution. Remote control unit 442 can control the channel selection and mapping via control bus 422 which is connected to CATV module 480. Either a hand-held IR remote control or a wireless remote control can be used to change the channel mapping of CATV module 480.

The front panel interface 462 provides for connectivity between the front panel controls (buttons) and the microprocessor 434. Through the front panel control the user can make channel changes as well as changing the configuration of the channels transmitted on the in-home coaxial network.

Telephony module 454 transmits and receives information from TDM bus 420 and produces an analog telephone signal which is compatible with telephone 194. The interface for the telephone is telephone jack 468, which in a preferred embodiment is an RJ-11 jack.

Figure 5:
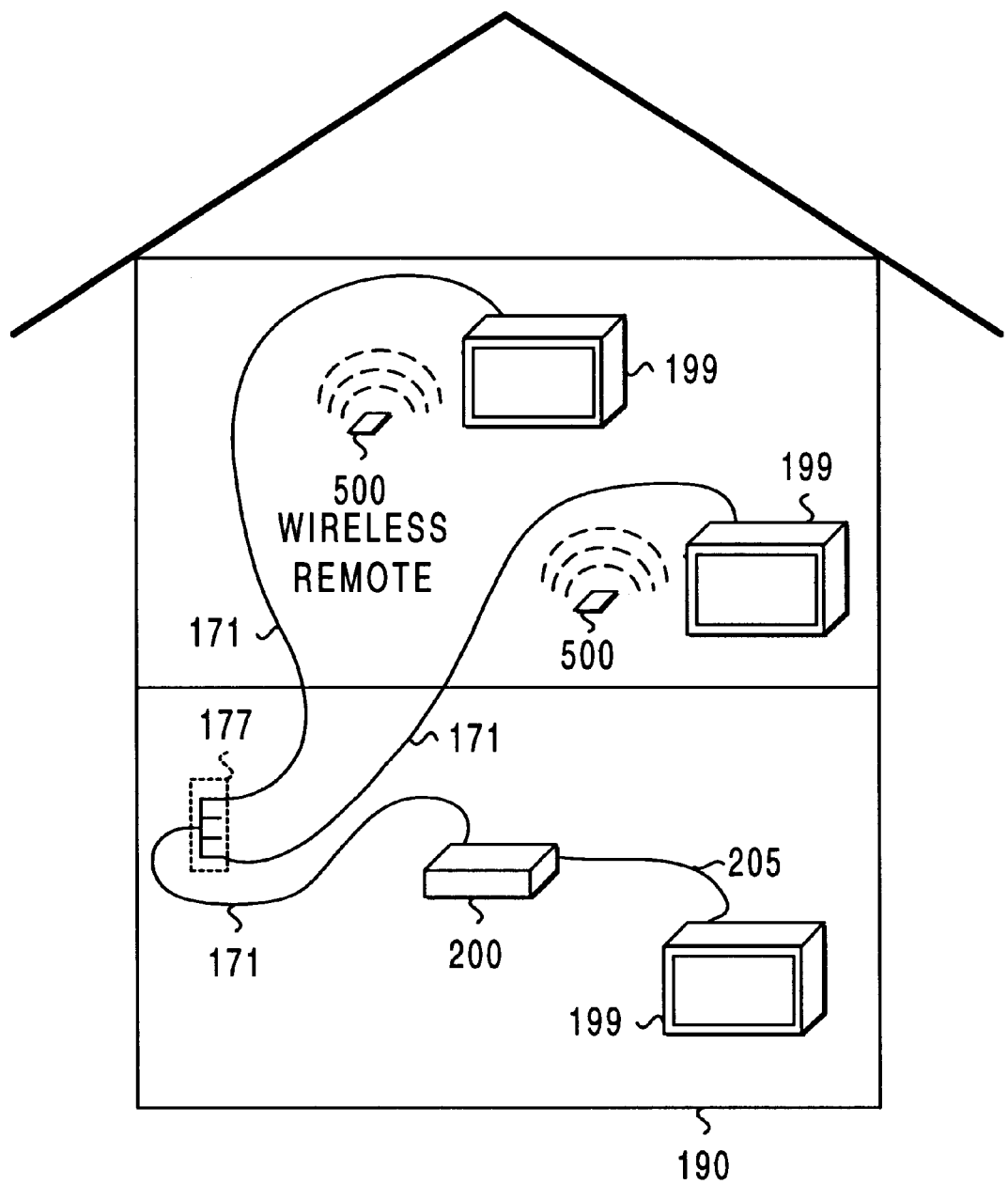
FIG. 5 illustrates a wireless method of signaling from remote locations in a home to a gateway.

FIG. 5 illustrates a method of controlling gateway 200 based on the use of a wireless remote 500 which transmits a UHF signal to the UHF receiver 470 illustrated in FIG. 4.

III. Gateway with Point-to-point in-home Coaxial Wiring

Figure 6:
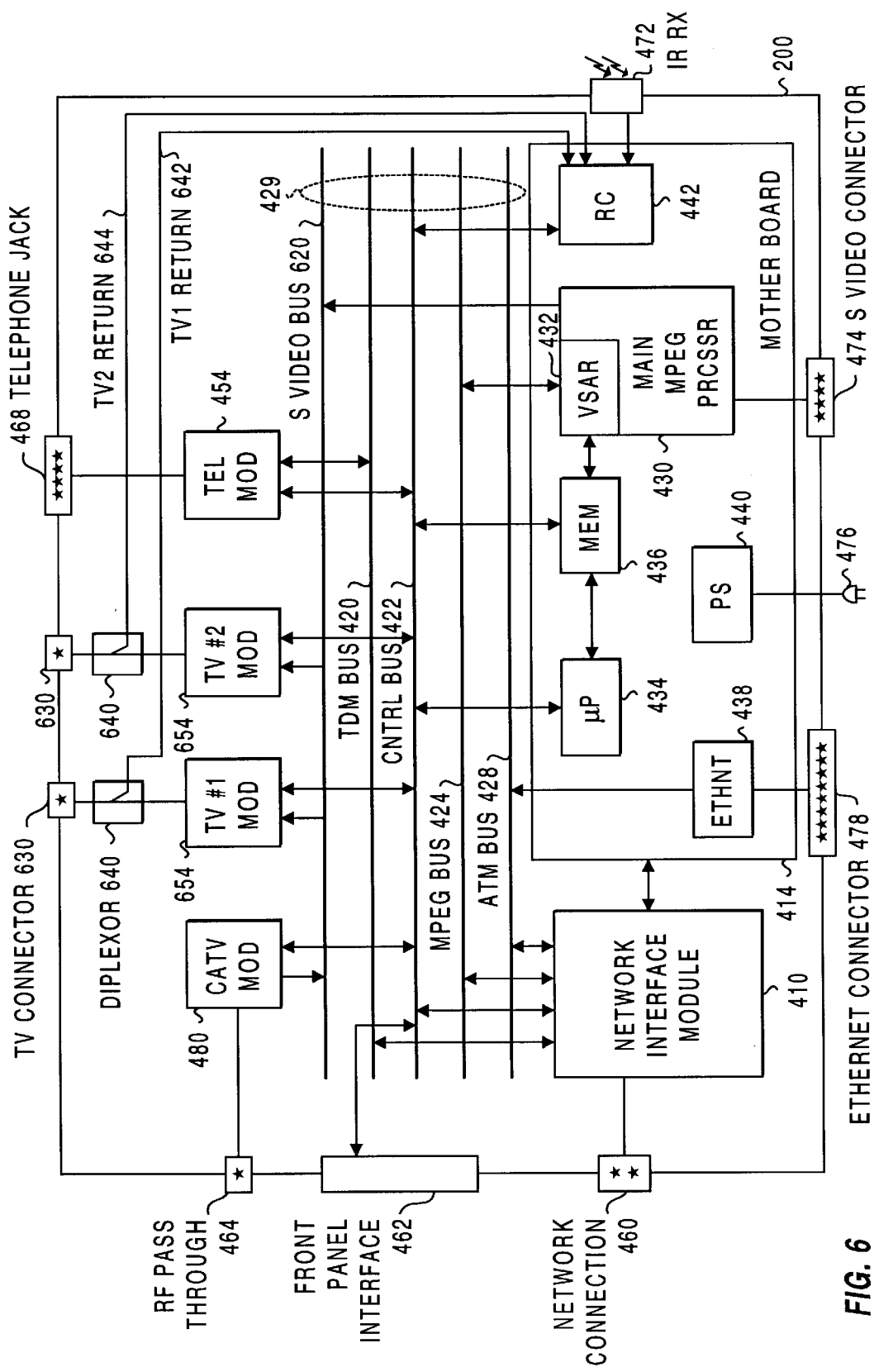
FIG. 6 illustrates an architecture for a video, data and telephony gateway which uses point-to-point in-home coaxial wiring.

FIG. 6 illustrates a gateway 200 which can be used in homes where there is point-to-point in-home coaxial cable wiring, and where the gateway can be located near the point where the coaxial wiring originates.

The gateway 200 shown in FIG. 6 has an main MPEG processor 430 which is capable of decompressing multiple MPEG streams. In a preferred embodiment, main MPEG processor 430 can decompress three video streams simultaneously, and generates three S-video signals which are available on S-video bus 620. The TV modules 654 can receive any of the S-video signals from S-video bus 620, and modulate the video signal onto an appropriate channel for reception by a television which is connected to that TV module 654 via coaxial cable and TV connector 630.

An RF pass-through 464 and CATV module 480 are used to map off-air broadcast or CATV signals to S-video, which can subsequently be transmitted to any of the televisions connected to TV connectors 630 or S-video connector 474.

In the embodiment illustrated in FIG. 6, control of the gateway 200 from locations in residence 190 is accomplished by means of return signals transmitted on the point-to-point in-home coaxial cable wiring. Return signals from remotes are received at TV connector 630, and a diplexor 640 is used to separate the return signals from the forward signals. The return signals from TV #1 are transmitted on TV1 return line 642 to remote control block 442, and return signals from TV #2 are transmitted on TV2 return line 644 to remote control block 442.

Figure 7:
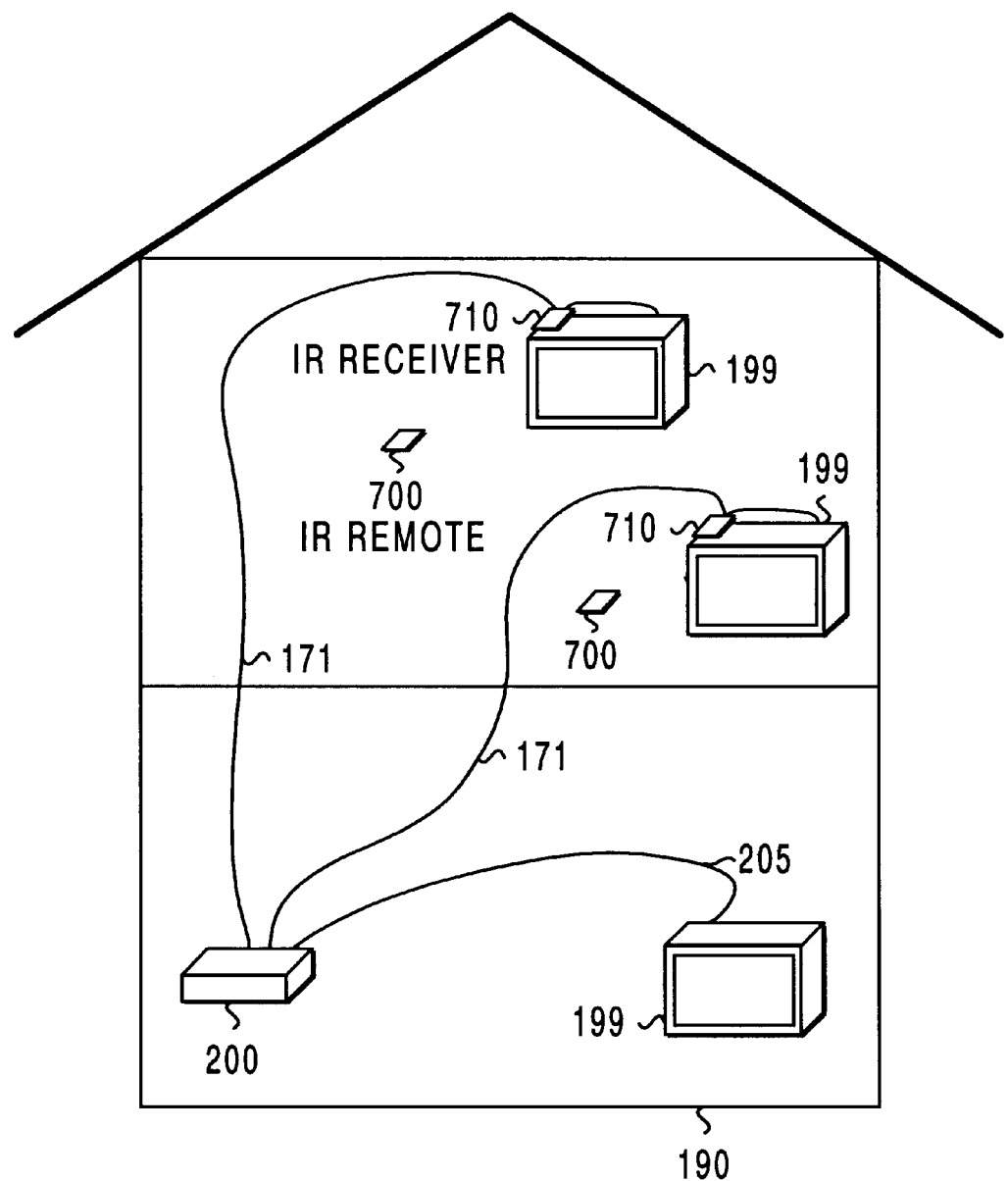
FIG. 7 illustrates a method for signaling from remote locations in the home to the gateway using the in-home coaxial wiring.

FIG. 7 further illustrates a method of remote control using the coaxial cable return, in which an IR receiver 710 which is associated with a television 199 receives IR signals from an IR remote 700, and converts the optical signal to an electrical signal which is transmitted over the coaxial cable to the remote control block 442 of FIG. 6 via the diplexor 640 and TV1 return 642 or TV2 return 644. Only a simple signaling protocol between IR receiver 710 and the remote control block 442 is required, and the IR receiver functionality can be easily placed in the television 199.

Although this invention has been illustrated by reference to specific embodiments, it will be apparent to those skilled in the art that various changes and modifications may be made which clearly fall within the scope of the invention.

The invention is intended to be protected broadly within the spirit and scope of the appended claims.

What is claimed is:

1. A method of distributing signals from a residential gateway comprising:
   receiving asynchronous transfer mode cells at said residential gateway, wherein the asynchronous transfer mode cells are received via a twisted wire pair cable connecting said residential gateway to a telecommunications network;
   extracting a series of MPEG video packets from the asynchronous transfer mode cells;
   transmitting the series of MPEG video packets over an MPEG bus to each of a plurality of video decoders;
   receiving the series of MPEG video packets at each of the plurality of video decoders;
   decoding the series of MPEG video packets at a first video decoder in the plurality of video decoders to produce a first analog television signal compatible with a first analog television set; and
   decoding the series of MPEG video packets at a second video decoder in the plurality of video decoders to produce a second analog television signal compatible with a second analog television set.

2. The method of claim 1, further comprising:
   receiving channel change commands from a first remote control located near the first analog television, wherein the channel change commands trigger a change in the contents of the asynchronous transfer mode cells received via the twisted wire pair cable; and
   receiving channel change commands from a second remote control located near the second analog television, wherein the channel change commands trigger a change in the contents of the asynchronous transfer mode cells received via the twisted wire pair cable.

3. The method described in claim 2, wherein
   said receiving channel change commands from a first remote control includes receiving infrared channel change commands from the first remote control; and
   receiving channel change commands from a second remote control includes receiving radio wave channel change commands from the second remote control.

4. The method described in claim 2, wherein
   said receiving channel change commands from a first remote control includes receiving infrared channel change commands from the first remote control; and
   receiving channel change commands from a second remote control includes receiving the channel change commands via a cable connection.

5. The method of claim 1, further comprising:
   transmitting the first analog television signal to the first analog television, wherein the first analog television signal is an S-video signal; and
   transmitting the second analog television signal to the second analog television, wherein the second analog television signal is a NTSC signal.

6. The method of claim 1, further comprising:
   extracting digital voice signals from the asynchronous transfer mode cells; and
   transmitting the digital voice signals to a telephone module over a time division multiplexing bus.

7. The method of claim 1, further comprising:
   extracting digital data signals from the asynchronous transfer mode cells; and
   providing the digital data signals to an Ethernet module.

8. The method of claim 1, wherein the telecommunications network is a DSL network.

9. The method of claim 1, wherein the telecommunications network is a very high speed digital subscriber line (VDSL) telecommunications network.

10. The method of claim 1, wherein the telecommunications network is a FTTC network.

11. A residential gateway for distributing signals comprising:
    a microprocessor;
    memory connected to said microprocessor;
    a network interface module, connected to a telecommunications network via a twisted wire pair cable, for receiving asynchronous transfer mode cells and extracting a series of MPEG video packets from the asynchronous transfer mode cells;
    an MPEG bus for transporting the series of MPEG video packets from said network interface module to a first video processor and from said network interface module to a second video processor;
    wherein the first video processor processes the series of MPEG video packets and creates a first analog signal for a first television set;
    wherein the second video processor processes the series of MPEG video packets and creates a second analog signal for a second television set; and a control bus connected to the microprocessor, the first video processor and the second video processor.

12. The residential gateway of claim 11, further comprising:

an infrared receiver for receiving channel change commands from a first remote control associated with the first television set, wherein the channel change commands trigger a change in the asynchronous transfer mode cells received via the twisted wire pair cable; and a wireless receiver for receiving channel change commands from a second remote control associated with the second television set, wherein the channel change commands trigger a change in the asynchronous transfer mode cells received via the twisted wire pair cable.

13. The residential gateway of claim 11, further comprising:

an infrared receiver for receiving channel change commands from a first remote control associated with the first television set, wherein the channel change commands trigger a change in the asynchronous transfer mode cells received via the twisted wire pair cable; and a cable compatible receiver for receiving channel change commands from a second remote control associated with the second television set, wherein the channel change commands trigger a change in the asynchronous transfer mode cells received via the twisted wire pair cable.

14. The residential gateway of claim 11, wherein the network interface module extracts digital voice signals from the asynchronous transfer mode cells and further comprising a telephony module for converting the digital voice signals to analog voice signals; and a time division multiplex bus for transmitting the digital voice signals from said network interface module to said telephony module.

15. The residential gateway of claim 11, wherein the network interface module extracts digital data signals from the asynchronous transfer mode cells and further comprising an Ethernet module for forwarding the digital data signals.

16. A residential gateway for distributing signals comprising:

a microprocessor;

memory connected to said microprocessor;

a network interface module, connected to a telecommunications network via a twisted wire pair cable, for receiving asynchronous transfer mode cells and capable of extracting MPEG video packets, digital data signals and digital voice signals from the asynchronous transfer mode cells;

a plurality of video processors, associated with a plurality of televisions, for processing the MPEG video packets and creating analog video signals for the associated televisions;

an MPEG bus for transporting the MPEG packets from said network interface module to said plurality of video processors;

a telephony module for converting the digital voice signals to analog voice signals;

a time division multiplex bus for transmitting the digital voice signals from said network interface module to said telephony module;

an Ethernet module for transmitting the digital data signals to equipment associated with the residential gateway;

a receiver for receiving channel change commands from remote controls associated with the plurality of televisions, wherein the channel change commands trigger a change in the contents of the asynchronous transfer mode cells received via the twisted wire pair cable; and a control bus, connected to said microprocessor, said plurality of video processors, said Ethernet module and said telephony module.

* * * * *